Figure 1:
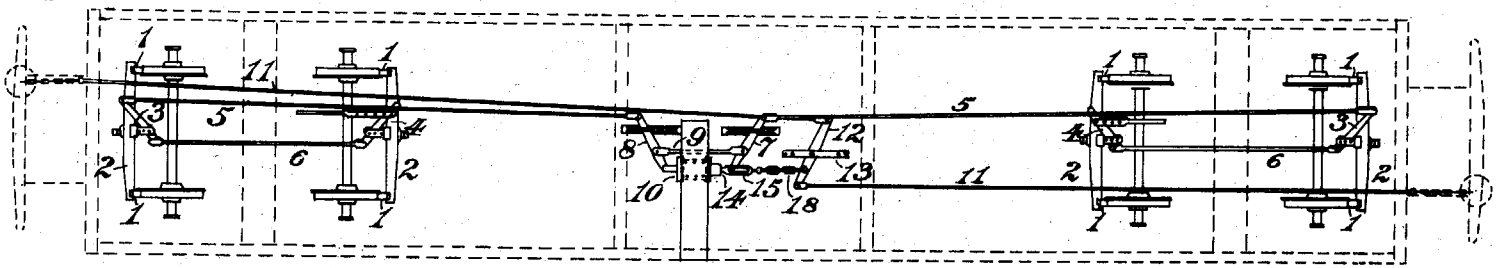

No. 11,990. Reissued May 13, 1902.

H. J. SMALL.

CAR BRAKE.

(Application filed Mar. 21, 1902.)

3 Sheets—Sheet 1.

WITNESSES:

James C. Herron.

S. R. Bell.

INVENTOR,

Henry J. Small, by Andrew Bell,

Att'y.

No. 11,990. Reissued May 13, 1902.

H. J. SMALL.

CAR BRAKE.

(Application filed Mar. 21, 1902.)

3 Sheets—Sheet 2.

WITNESSES:

James C. Herron

S. R. Bell

INVENTOR,

Henry J. Small, by John Andrew Bell,

Att'y.

No. 11,990. Reissued May 13, 1902.

H. J. SMALL.

CAR BRAKE.

(Application filed Mar. 21, 1902.)

3 Sheets—Sheet 3.

WITNESSES:

James C. Herron.

S. R. Bell.

INVENTOR,

Henry J. Small, by Johnson & Bell,

Att'y.

UNITED STATES PATENT OFFICE.

HENRY J. SMALL, OF SACRAMENTO, CALIFORNIA, ASSIGNOR TO THE WESTINGHOUSE AIR BRAKE COMPANY, OF PITTSBURG, PENNSYLVANIA.

CAR-BRAKE.

SPECIFICATION forming part of Reissued Letters Patent No. 11,990, dated May 13, 1902.

Original No. 510,200, dated December 5, 1893. Application for reissue filed March 21, 1902. Serial No. 99,348.

*To all whom it may concern:*

Be it known that I, HENRY J. SMALL, of Sacramento, in the county of Sacramento and State of California, have invented a certain new and useful Improvement in Railroad-Car Brakes, of which improvement the following is a specification.

My invention relates more particularly to car-brakes of the class or type ordinarily known as the "Hodge" system; and its object is to facilitate and perfect their operation and afford increased security against accidents, especially in operating trains on long and heavy grades, by the provision of means whereby the brakes may be operated either by hand or by fluid-pressure, both acting in the same direction in application and also in release, so as to be supplemental one to the other and acting either independently or in unison, as desired.

The improvement claimed is hereinafter fully set forth.

In brake systems of the Hodge class, provided with both air and hand actuating appliances, as ordinarily heretofore employed on passenger-train cars such brake-levers are provided, and their combination with the hand-brake shafts and the pistons of the air-brake cylinders is such that the maximum working power of both the air and hand brake mechanisms cannot be simultaneously utilized in the application of the brakes, and this for the reason that in brake systems of the class referred to the pull of the hand-brake mechanism works against—that is, in a direction opposite to—the working movement or stroke of the air-brake piston, and in like manner the outward stroke of the air-brake works against the normal direction of pull of the hand-brake apparatus. Hence as in this sense they work against each other or in what is sometimes known as "contrary" directions, the maximum working power of both cannot be simultaneously utilized in such systems of apparatus, and in practical railroading it is sometimes important and exceedingly desirable to be able to utilize both the air and the hand brake mechanisms, one to supplement the other, especially in cases of the partial failure of either, and particularly so with a train descending a long grade. Sundry of the structural features hereinafter described are also applicable to freight-car systems of brakes in which hand-operating power is applied at one end only of the car.

My improvement obviates danger of accidents from failure of air-brakes and delays in operating trains on heavy grades, resultant upon the conditions of operations above referred to, and its construction and operation as applied in regular service will now be described.

Figure 2:
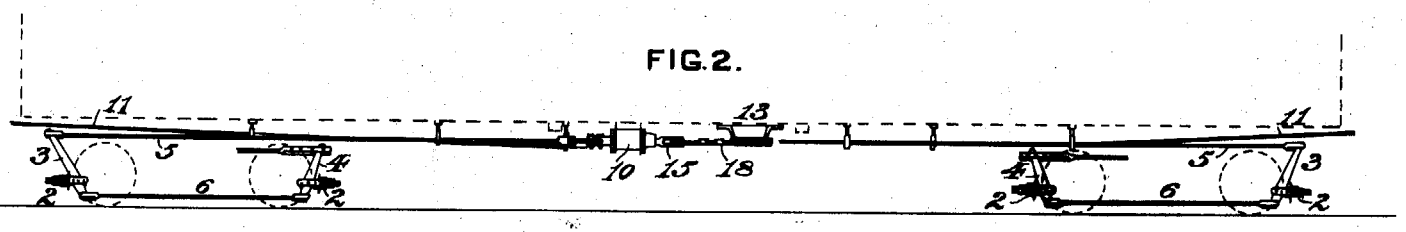
Figure 3:
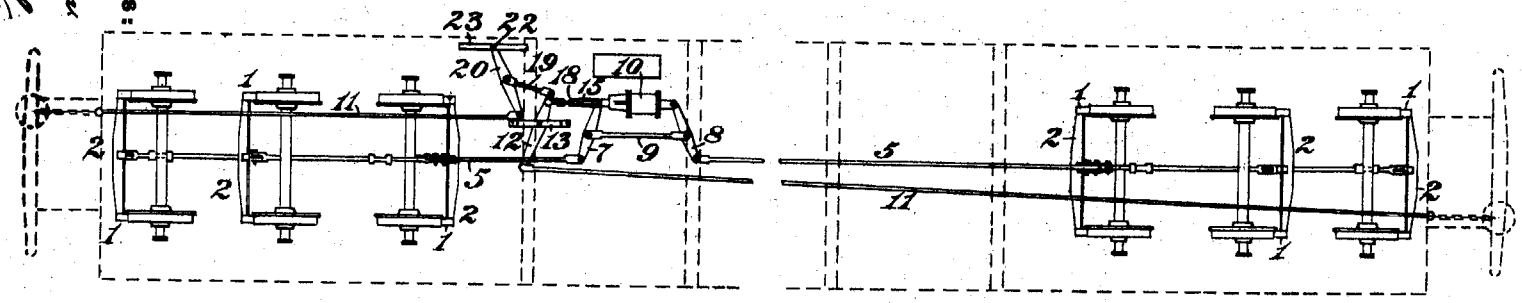
Figure 4:
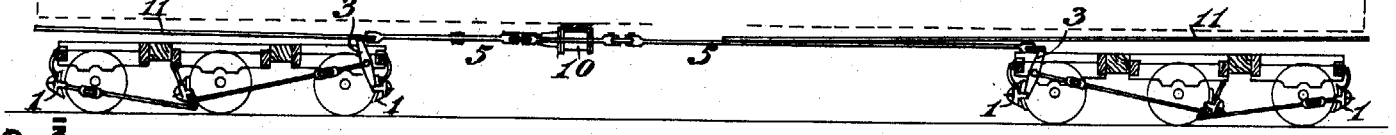
Figure 5:
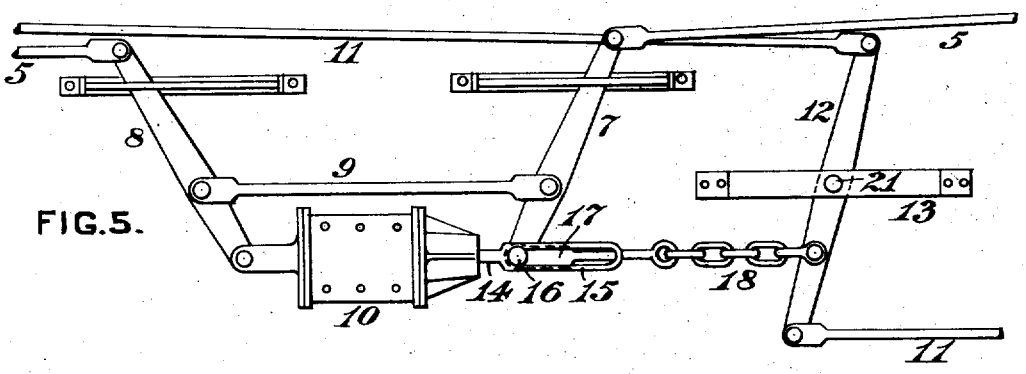
Figure 6:
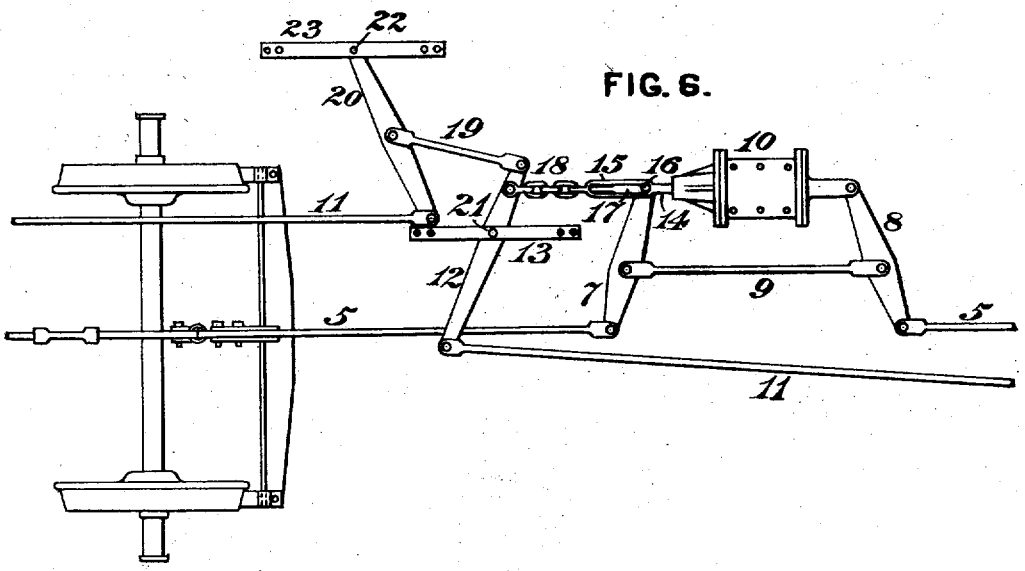
Figure 7:
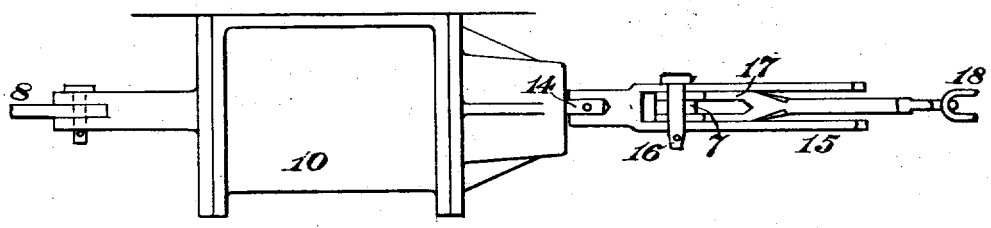

In the accompanying drawings, Figure 1 is a plan view of a brake apparatus for a passenger-car, illustrating an embodiment of my invention; Fig. 2, a side view in elevation of the same; Fig. 3, a plan view illustrating a modification as applied in connection with a car having six-wheeled trucks; Fig. 4, a side view in elevation of the same; Fig. 5, a plan view, on an enlarged scale, of the brake-cylinder and brake-cylinder-lever connections shown in Figs. 1 and 2; Fig. 6, a similar view of said members as shown in Figs. 3 and 4; and Fig. 7, a side view, partly in elevation and partly in section, of the brake-cylinder cross-head and clevis.

In the practice of my invention as exemplified in Figs. 1, 2, 5, and 7 I provide a system of brake-levers and connection which accords in its general features with the well-known Hodge system, which being familiar to those skilled in the art need not be herein at length described. The structural differences between my improvement and prior constructions may be briefly stated as consisting in the elimination of the two floating levers heretofore employed for transmitting power from the brake-shafts and brake-cylinder to the truck-levers, the substitution of a single pull-rod connecting the brake-levers of each truck with the adjacent brake-cylinder lever for the two pull-rods heretofore employed, and the provision of an independent hand-brake lever and a slotted cross-head, clevis, and chain connection between the brake-cylinder piston-rod and the hand-brake appliances.

The brake-shoes 1 are fixed to brake-beams 2, hung on the truck-frames, and are applied to the wheels by live truck-levers 3 and dead truck-levers 4, pivoted to the brake-beams and coupled at their lower ends, one to the other, by pull-rods 6. Power for effecting the application of the brakes, either by air-pressure or by hand, is transmitted to the live truck-levers 3 through pull-rods 5, one for each truck, which are coupled at their opposite ends to brake-cylinder levers 7 and 8, respectively, and are also connected with hand-brake connecting-rods 11, to which hand-power is applied in the usual manner through either or both of the brake-shafts at the ends of the car. The brake-cylinder levers 7 8 are coupled by a connecting-rod 9. The connection of the hand-brake rods 11 with the truck-brake levers 3 4 and brake-cylinder levers 7 8 is such that draft for applying the brakes will be exerted upon the truck-brake levers in the same direction by both the hand-brake shafts and the brake-cylinder levers, and the release of draft by either will be in the same direction as required for release of draft by the other. To this end an independent double-armed hand-brake lever 12 is pivoted at or near its center by a pin 21 to a bracket or support 13, secured to the car-frame, and is coupled at its ends to the hand-brake connecting-rods 11. The brake-cylinder 10 is connected in the usual manner with the other elements of an air or other fluid-pressure brake apparatus, of any suitable and preferred construction, adapted to effect the application of the brakes by fluid-pressure, which elements, not forming in and of themselves any part of my invention and being familiar to those skilled in the art, are not shown. The piston-rod 14 of the brake-cylinder 10 is provided with a cross-head 15, having longitudinally-slotted jaws in which a cross-head pin 16 is fitted to slide freely. The brake-cylinder lever 7 is coupled by the pin 16 to the cross-head 15 and to a clevis 17, fitted to slide between the jaws of the cross-head and linked to one end of a flexible connection 18, preferably a chain, the opposite end of which is coupled to the independent hand-brake lever 12 between its pivot 21 and one of its ends.

In making an application of the brakes by air-pressure under the above or a substantially similar construction the outward movement of the brake-cylinder piston and its rod 14 upon the admission of air to the brake-cylinder moves the cross-head 15 and its pin 16 in the same direction, and through the resultant movement of the coupled brake-cylinder levers 7 and 8 and their connections to the truck-brake levers and brake-shoes applies the brakes without the intervention (as in the ordinary Hodge system) of floating or other auxiliary levers. During this operation the independent hand-brake lever 12 remains stationary, the chain 18 having become slack. If it be then desired to apply the hand-brake, a few turns of either brake-shaft will, acting through the adjacent brake-shaft connecting-rod 11 upon the independent hand-brake lever 12, take up the slack of the chain 18 and hold the brakes upon both trucks of the car in case the air should leak off or be released. In making a hand application of the brakes when the air-brake is released the piston and piston-rod 14 of the brake-cylinder remains stationary in position to be actuated for application of the brakes upon the admission of air to the brake-cylinder, and the cross-head pin 16 moves, with the independent hand-brake lever 12, in the slots of the jaws of the cross-head in accordance with the movement of the lever 12 to apply the brakes due to draft upon either of the hand-brake connecting-rods 11. It will be seen that while the air and hand brakes act independently one of the other both may be set at the same time, if desired, one assisting or supplementing the other, if needed, or acting in its stead in the event of its complete failure.

Figs. 3, 4, and 6 illustrate a modification of the above construction as applied to cars having six-wheeled trucks equipped with triple brakes, in which the brake-cylinder is located at a greater distance from the longitudinal center line of the car than in the previous instance. To admit of ready application with such location of the brake-cylinder, an auxiliary brake-lever 20 is pivoted at one of its ends by a pin 22 to a bracket or support 23 and is coupled at its opposite end to one of the hand-brake connecting-rods 11. The other connecting-rod 11 is coupled, as in the prior instance, to one end of the independent hand-brake lever 12, and the opposite end of said lever is coupled by a rod 19 to the auxiliary lever 20 between its pivot and its free end. It will be obvious that the operation is the same as in the instance first above described.

Among the advantages due to my improvement may be stated generally-increased security in the operation of trains, particularly upon long and steep gradients, and specifically a decrease in the number of working parts required to operate the brakes, free and independent action of both air and hand brakes under all circumstances, the capability of setting both air and hand brakes at the same time, so that in the event of the failure of one an efficient application of the brake may be made by the other, and the capability of setting the brakes on both trucks from either end platform by the turning of one brake-wheel only.

I claim as my invention and desire to secure by Letters Patent—

1. The combination, in a railroad-car brake, of a brake-cylinder, a brake-cylinder lever for actuating truck-brake levers at both ends of a car by fluid-pressure in said cylinder, a hand-brake lever, and connections from the hand-brake lever to the brake-cylinder lever and to hand-brake devices at each end of the car, said connections adapting the brake-cylinder lever to be operated by the hand-brake lever from either end of the car, and in the same direction as by the fluid-pressure in the brake-cylinder, substantially as set forth.

2. The combination, in a railroad-car brake, of a hand-brake lever, hand-brake devices at both ends of a car connected to said hand-brake lever, a fluid-pressure cylinder fitted with a piston and rod, a lever adapted to be actuated in the same direction, independently by either of the end hand-brake devices or by the piston-rod of the fluid-pressure cylinder, and connections coupling said lever to the hand-brake lever, substantially as set forth.

3. The combination, in a railroad-car brake, of a system of truck-brake levers for actuating connected brake-shoes, a fluid-pressure brake apparatus coupled thereto, an independent hand-brake apparatus operated from either end of the car, and a flexible connection coupling the hand-brake apparatus with a member of the fluid-pressure brake apparatus having the capacity of independent movement relatively to the actuating piston-rod thereof, substantially as set forth.

4. The combination, in a railroad-car brake, of a system of truck-brake levers for actuating connected brake-shoes, a fluid-pressure cylinder having a piston and rod, an intermediate connection coupled positively to one of said truck-brake levers, and coupled to the piston-rod with the capacity of independent movement, two hand-brake connecting-rods adapted to be actuated by manual power from either end of the car, and a flexible connection by which the hand-brake connecting-rods are coupled to the intermediate connection of the piston-rod and truck-brake lever, substantially as set forth.

5. The combination, in a railroad-car brake, of two systems of truck-brake levers, adapted to actuate connected brake-shoes on trucks at opposite ends of a car, a fluid-pressure cylinder having a piston and rod, an intermediate connection coupled positively to a lever of each of said systems, and coupled to the piston-rod with the capacity of independent movement, two hand-brake connecting-rods coupled one to the other and adapted to be actuated by manual power applied at either end of the car, and a flexible connection by which the hand-brake connecting-rods are coupled to the intermediate connection of the piston-rod and truck-brake levers, substantially as set forth.

6. The combination, in a railroad-car brake, of a brake-shoe, a brake-lever connected thereto, a fluid-pressure cylinder fitted with a piston and rod, a brake-cylinder lever coupled to said rod with the capacity of independent movement, and coupled positively to the lever of the brake-shoe, a hand-brake connecting-rod, an independent hand-brake lever coupled thereto, and a flexible connection coupling said independent hand-brake lever to the brake-cylinder lever, substantially as set forth.

7. The combination, in a railroad-car brake, of a brake-shoe, a brake-lever connected thereto, a fluid-pressure cylinder fitted with a piston and rod, a slotted cross-head fixed to said rod, a brake-cylinder lever coupled to the lever of the brake-shoe, and traversing on the piston-rod cross-head, a hand-brake connecting-rod, an independent hand-brake lever coupled thereto, and a flexible connection coupling said independent hand-brake lever to the brake-cylinder lever, substantially as set forth.

8. The combination, in a railroad-car brake, of two systems of truck-brake levers, adapted to actuate connected brake-shoes on trucks at opposite ends of a car, a fluid-pressure cylinder fitted with a piston and rod, a brake-cylinder lever having a fixed fulcrum, and coupled to a brake-lever of one of the trucks, a brake-cylinder lever having a fulcrum which is movable on an extension of the piston-rod, and coupled to a brake-lever of the other truck, a rod coupling said brake-cylinder levers one to the other, two hand-brake connecting-rods coupled one to the other and adapted to be actuated by manual power applied at either end of the car, and a flexible connection by which the hand-brake connecting-rods are coupled to one of the brake-cylinder levers, substantially as set forth.

9. The combination, in a railroad-car brake, of two systems of truck-brake levers, adapted to actuate connected brake-shoes on trucks at opposite ends of a car, a fluid-pressure cylinder fitted with a piston and rod, an intermediate connection coupled positively to a lever of each of said systems and coupled to the piston-rod with the capacity of independent movement, two hand-brake connecting-rods each adapted to be actuated by manual power applied at one end of the car, an independent hand-brake lever coupled to one of said hand-brake connecting-rods, an auxiliary brake-lever coupled to the other hand-brake connecting-rod and to the independent hand-brake lever, and a flexible connection coupling the independent hand-brake lever to the intermediate connection of the piston-rod and truck-brake levers, substantially as set forth.

HENRY J. SMALL.

Witnesses:
L. T. HATFIELD,
A. B. REYNOLDS.